Oct. 18, 1966   J. M. CUMBERLAND   3,279,047
EXTRACTING TOOLS
Filed April 2, 1965
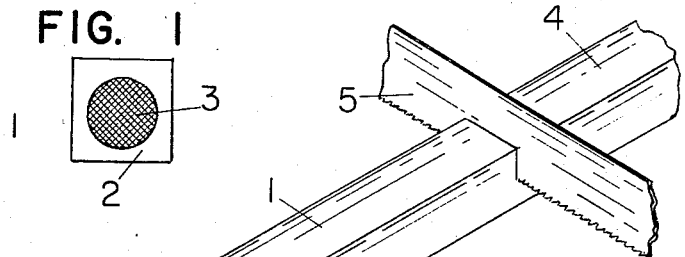
FIG. 1
FIG. 2
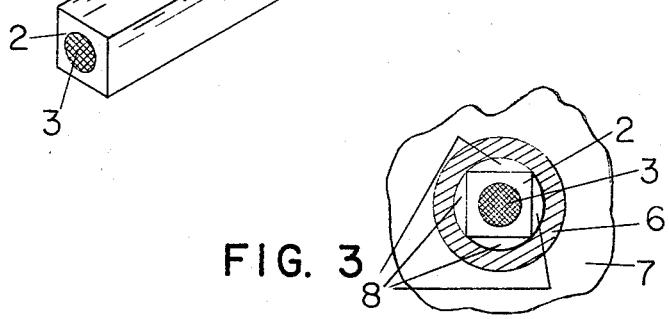
FIG. 3
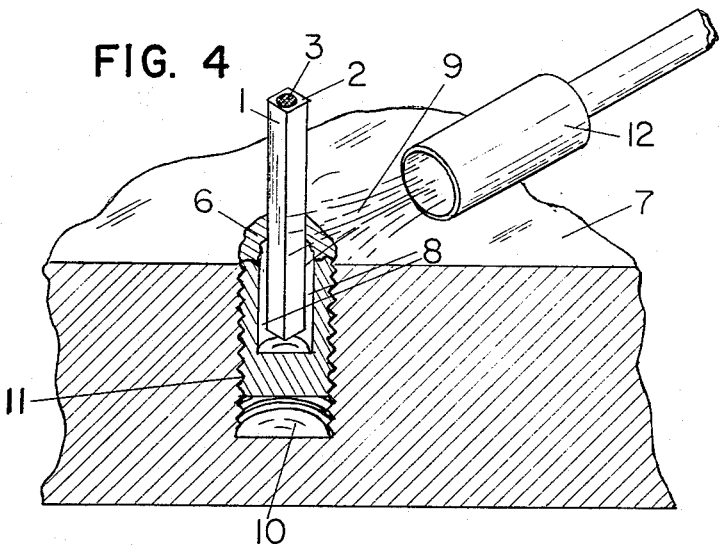
FIG. 4
INVENTOR.
J. M. Cumberland

United States Patent Office 3,279,047
Patented Oct. 18, 1966

---

3,279,047
EXTRACTING TOOLS
Joseph M. Cumberland, P.O. Box 1313, Muskogee, Okla.
Filed Apr. 2, 1965, Ser. No. 445,204
1 Claim. (Cl. 29—427)

This invention relates to a tool for extracting a threaded member from an associated threaded female member, and more particularly, to a tool to remove the remaining portions of screws and studs which have been broken off close to the threaded female member.

It is the object of the invention to provide a tool for removing broken studs which need not be perfectly centered or aligned with the axis of the stud to be removed.

A further object of the invention is to provide a tool which need not be driven into the center bore of a stud to engage the walls of the stud for purpose of transmitting the torque necessary for stud removal.

A still further object of the invention is to provide a tool which is relatively simple and economical in construction and reliable and efficient in use.

Yet a still further object of the invention is to provide a tool designed to eliminate the necessity of expensive tool steel in its working body, and a tool whose function does not depend on complex cutting edges, flutes, or wedging and distorting actions.

A still further object of the invention is to provide a tool which can supply the demands of a variety of stud sizes with a minimum of tool sizes, and also a tool with a basic shape which can be altered to fit a smaller size stud by grinding the tool to fit.

Yet a still further object of the invention is to provide a tool which can transmit torque to a stud in either a clockwise or counterclockwise direction.

The present invention contemplates an elongated tool body with an axial core of material of a lower melting point than the material of the body. The external surface of the tool body is shaped to provide coupling with a torque-producing device. Heat is applied to the body and core until the core material melts and flows into the bore of a stud member and up the annulus between the external surface of the tool body for a substantial distance. Solidification of the bore material forms a link between the tool body and stud member which provides transmission of torque from the torque-producing device to the stud member.

The exact nature of the invention as well as other objects and advantages thereof will be readily apparent from the consideration of the following specification relating to the drawing in which:

FIG. 1 is an end view of the tool.

FIG. 2 is a view of the tool stock which can be cut into any desired lengths.

FIG. 3 is a top view of the tool as it would appear installed in a broken stud.

FIG. 4 is a sectional view of a broken stud with the tool fitted prior to the removal operation.

Referring to the drawing:

In FIG. 1, 1 is an end view of the extractor, 2 is the tool body, of metal or other suitable material, formed from a linearly elongated body having a four sided cross sectional area with a center core 3 of a low melting point material such as lead, solder or plastic.

In FIG. 2, 1 is a section of the tool material 4 or stock which could be supplied in any length and cut off as desired with an ordinary hack saw 5. 2 is the rectangular end of the tool, with 3 the meltable core material.

In FIG. 3, 7 is a section of an object with 6 a broken stud, 8 a bore provided or drilled in the broken stud. 2 is the end view of the tool body and 3 the center core.

In FIG. 4, 1 is the tool, 7 is a cross section of a threaded female member having a broken threaded male member, or stud 6 with the threads 11. 8 is a center bore either provided or drilled for insertion of the tool 1. 10 is a section of the threaded female member 11, which does not encompass the threaded male member 6. 2 is the end of the tool, with 3 the center core. 9 is a flame from a torch 12, used to melt the core material 3 of the tool 1 and allow this material to flow into the space about the tool 8.

As shown in FIG. 4, the tool 1 is used to remove a broken threaded male member 6, or stud, from a threaded female member 7 having a threaded bore 10.

To accomplish this, a section of the proper length and size tool material 1 is cut from the tool stock 4 as in FIG. 2. The broken stud must be provided with a center bore 8 which has a diameter less than the diameter of the male member 6.

Either end of the proper size tool is then inserted into this bore. If the bore provided is smaller than the nearest available tool size (measured diagonally across the tool end portion), the tool may be ground down to fit, using only reasonable care to maintain the same general rectangular shape. This being possible because the operation of the tool does not depend on a wedging or cutting action, nor upon ground edges or flutes.

In the event of removing a threaded male member from a threaded female member where the center bore extends through the entire length of the threaded male member, as in a broken section of pipe, a false or temporary bottom must be provided to support the working portion of the tool.

After the tool of proper size and length has been inserted into the provided bore of the stud, heat such as a torch flame is applied to the tool body 1 and the stud 6 to cause the center core 3 of the tool to become melted and allow this molten material to flow out the bottom of the tool body 2 and into the center bore 8 thus surrounding the outer body of the tool 1. The melted material is then allowed to cool and re-harden. This can be hastened by use of water. Then a wrench may be fitted to the upper portion of the tool body, and a force applied to the wrench to rotate the tool about its longitudinal axis to back out the threaded male member, in this case, a stud 6. The torque from the wrench is transmitted through the tool to the stud because the rectangular tool body is now imbedded solidly in the material which formerly formed the longitudinal core of the tool. This material also adheres to the wall of the formed bore 8 and transmits the torque to the threaded male stud 6.

The cross sectional dimensions and lengths of the working section of the tool 1 depend upon the size of the pipe or stud to be removed. In use, the mechanic is provided with a series or set of tool stock which vary in size. The mechanic selects the proper size tool corresponding to the size of the center bore in the male member to be removed, although in the case of this tool, the variety of sizes necessary for complete coverage are less, since a tool slightly larger than the provided center bore can be altered by grinding down all sides of the tool until the tool will fit the center bore.

While there have been shown, described and pointed out the fundamental novel features of the invention as applied to the preferred embodiment, it will be understood that various omissions, substitutions, changes in form, and details of the tool illustrated may be made by those skilled in the art without departing from the spirit of the invention. It is intended to be limited only as indicated by the scope of the following claim.

I claim:

A method for removing a broken-off stud from a body, comprising the steps of,

Step A. Forming a hole in the end of said stud,

Step B. Inserting a tool formed with a core of material having a relatively low melting point in the bore of said stud, Step C. Heating said tool and melting said core in said bore so that the core material will flow into and up the bore, and Step D. Rotating said tool and removing said stud after said material solidifies.

References Cited by the Examiner

UNITED STATES PATENTS

| | | | |
|---|---|---|---|
| 2,568,242 | 9/1951 | Matteson | 29—502 X |
| 2,912,890 | 11/1959 | Robinson | 81—535 |
| 3,191,272 | 6/1965 | Gwyn. | |

OTHER REFERENCES

Oxy-Acetylene Tips, vol. 16, No. 2, February 1937, page 40.

WILLIAM FELDMAN, *Primary Examiner.*

JAMES L. JONES, Jr., *Assistant Examiner.*